United States Patent [19]

Kobayashi

[11] Patent Number: 5,136,573
[45] Date of Patent: Aug. 4, 1992

[54] INFORMATION RECORDING APPARATUS AND METHOD

[75] Inventor: Tadashi Kobayashi, Chiba, Japan

[73] Assignee: Kabushiki Kaisha Toshiba, Kawasaki, Japan

[21] Appl. No.: 372,464

[22] Filed: Jun. 28, 1989

[30] Foreign Application Priority Data

Jun. 30, 1988 [JP] Japan .................. 63-163962
Jul. 20, 1988 [JP] Japan .................. 63-179201

[51] Int. Cl.⁵ .................. G11B 7/125; G01D 15/14
[52] U.S. Cl. .................. 369/116; 369/121
[58] Field of Search .............. 369/109, 110, 118, 121, 369/116, 122; 346/76 L; 365/119, 127, 113

[56] References Cited

U.S. PATENT DOCUMENTS

| | | | |
|---|---|---|---|
| 4,647,950 | 3/1987 | Nosaki et al. | 355/69 |
| 4,773,059 | 9/1988 | Minemura et al. | 369/108 |
| 4,938,915 | 7/1990 | Saito | 369/116 |

FOREIGN PATENT DOCUMENTS

62-140297 6/1987 Japan .
62-250529 10/1987 Japan .
63-63142 3/1988 Japan .

Primary Examiner—Roy N. Envall, Jr.
Assistant Examiner—Hindi Nabil
Attorney, Agent, or Firm—Finnegan, Henderson, Farabow, Garrett and Dunner

[57] ABSTRACT

An information recording apparatus includes a record signal processor for converting information to be recorded into an analog signal having three levels or more, a laser beam source for emitting a laser beam whose power is modulated at multiple levels in accordance with the three levels or more of the processed signal, and an optical system for focusing/radiating the laser beam on an information recording medium. The information recording medium has a recording layer. The laser beam whose power is modulated at the multiple levels is radiated on the recording layer. As a result, a plurality of phases having different crystallinities are obtained in a radiated portion in accordance with the laser power, and hence multi-level information is recorded in the data recording medium. The recorded information can be reproduced by detecting optical characteristics in these phases.

2 Claims, 5 Drawing Sheets

INFORMATION RECORDING APPARATUS AND METHOD

BACKGROUND OF THE INVENTION

1. Field of the Invention

The present invention relates to an information recording apparatus and method capable of radiating a light beam onto an information recording medium to record multi-level data in a beam-radiated portion.

2. Description of the Related Art

To increase capacity and processing speed of computers in the future, increases in density and capacity of computer memories have become an important technical subject. In currently available optical memories, such as optical disks and cards, only a one-level signal (i.e., a signal corresponding to the presence or absence of a record) can be written in a single record spot. In such memories, a recording density of $10^8$ bits/cm$^2$ is the practical upper limit, which is not sufficient to achieve the aforestated design goals for computers.

In order to overcome this memory density limit, a multi-value signal recording system may be considered for writing a multi-value signal in a single record spot. An ultra-high density optical memory using photochemical hole burning (PHB) is known as one example of a memory employing such a multi-value recording system (Topical Meeting on Optical Data storage, Mar. 11-13, 1987, Stateline, Nev.). PHB is a phenomenon in which holes are generated in the absorption spectrum of a guest dispersed in a host recording medium. In this phenomenon, a photochemical reaction occurs only in a guest which has absorbed a laser beam, and the guest in an energy state at a laser wavelength position is developed to generate a hole. If "0"- and "1"-level signals based on the presence/absence of a hole are used, multi-value recording in units of wavelengths can be accomplished.

In such a multi-value recording system using PHB, however, the PHB memory film must be kept at a temperature as low as several to several ten degrees K., and many problems in using such film as an optical memory device remain unsolved. Hence, any practical application of the system has not yet been realized.

SUMMARY OF THE INVENTION

The present invention solves the above-described problems and has, as its object, to provide an information recording apparatus and method capable of realizing high-density recording in practical applications.

According to the present invention, an information recording apparatus is provided for recording information in an information recording medium, the apparatus comprising signal processing means for converting an information signal to be recorded into a signal having three levels or more; light beam output means used to output a light beam whose energy is modulated at multiple levels in accordance with the three levels or more of the processed signal; and optical means for focusing/radiating the light beam onto the information recording medium, wherein the multi-level information is recorded in the information recording medium by changing a beam-radiated portion of the information recording medium among a plurality of states.

Also, according to the present invention, an information recording method is provided, comprising the steps of converting information to be recorded into a signal having three levels or more, and radiating a light beam whose energy is modulated at multiple levels in accordance with the signal onto an information recording medium so as to change a radiated portion between a plurality of states, thereby recording multi-level information in the recording medium.

BRIEF DESCRIPTION OF THE DRAWINGS

A more complete appreciation of the invention and many of the attendant advantages thereof will be more readily obtained through reference to the following detailed description and accompanying drawings, in which.

DETAILED DESCRIPTION OF THE PREFERRED EMBODIMENT

Figure 1:
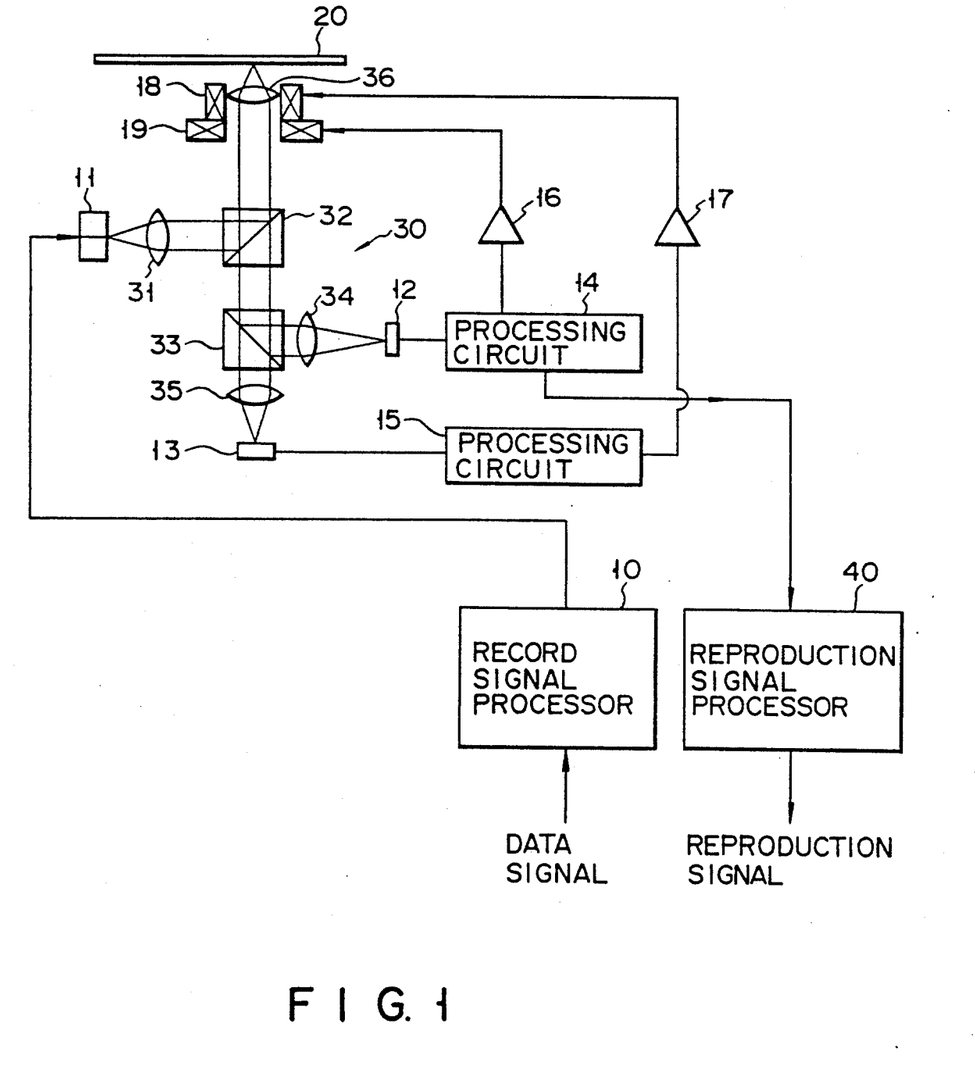
FIG. 1 is a schematic view of an information recording apparatus according to an embodiment of the present invention.

An embodiment of the present invention will be described in detail below with reference to the accompanying drawings. FIG. 1 is a schematic view of an information recording apparatus according to an embodiment of the present invention. A record signal processor 10 converts an input data signal into a signal having a plurality of levels; the structure of processor 10 will be described in detail later. The processed signal having the plurality of levels is then output to a semiconductor laser 11. Laser 11 radiates a recording laser beam having multi-level energy or wavelengths in accordance with the signal of the plurality of levels. In this case, in order to change the energy of a laser beam in multiple levels, one or both of the intensity and pulse width of the laser beam may be changed, or the wavelength of the laser beam may be changed. When a laser beam having such multi-level optical characteristics is radiated onto a recording layer (to be described later) of an optical disk 20 through an optical system 30, the state of the radiated portion of disk 20 is changed according to the energy of the laser beam, thereby resulting in recording of multi-level data.

When data recorded in disk 20 is to be reproduced, semiconductor laser 11 outputs a constant laser beam having an intensity lower than that of a recording laser beam. The reproducing laser beam output from laser 11 is radiated onto information recording medium 20 through optical system 30, and a reflected beam from medium 20 is directed incident on an opto-electric conversion element 12 through optical system 30. A signal converted by element 12 is supplied to a reproduction signal processor 40 through a processing circuit 14. As a result, reproduction signals corresponding to multilevel data are output, as will be described later.

If the information stored in recording medium 20 is of, e.g., a phase transformation type, the recorded information can be erased by radiating a laser beam, having an intensity lower than that of the recording laser beam, onto the information-recorded portion of the recording layer of the medium 20 so as to return it to its original phase.

In the optical system 30, a divergent laser beam output from the semiconductor laser 11 is collimated by a collimator lens 31 and is incident onto a beam splitter 32. A beam reflected by beam splitter 32 is converted/radiated onto information recording medium 20 through a focusing lens 36. When a reproducing laser beam is output from laser 11, the laser beam is reflected by medium 20, passed through beam splitter 32, and guided to a half mirror 33. The portion of the beam passing through half mirror 33 is guided to an optoelectric conversion element 13 through a lens 35, and the portion of the beam reflected by the half mirror 33 is incident onto photoelectric conversion element 12 through a lens 34.

As described above, one signal output from optoelectric conversion element 1 is output to reproduction signal processor 40 through processing circuit 14. Another signal from processing circuit 14 is guided to a tracking controller 19 through an amplifier 16 so as to adjust the radiation position of the beam. In addition, the signal output from opto-electric conversion element 13 is supplied to a focusing controller 18 through a processing circuit 15 and an amplifier 17, thereby performing focusing control.

Figure 2:
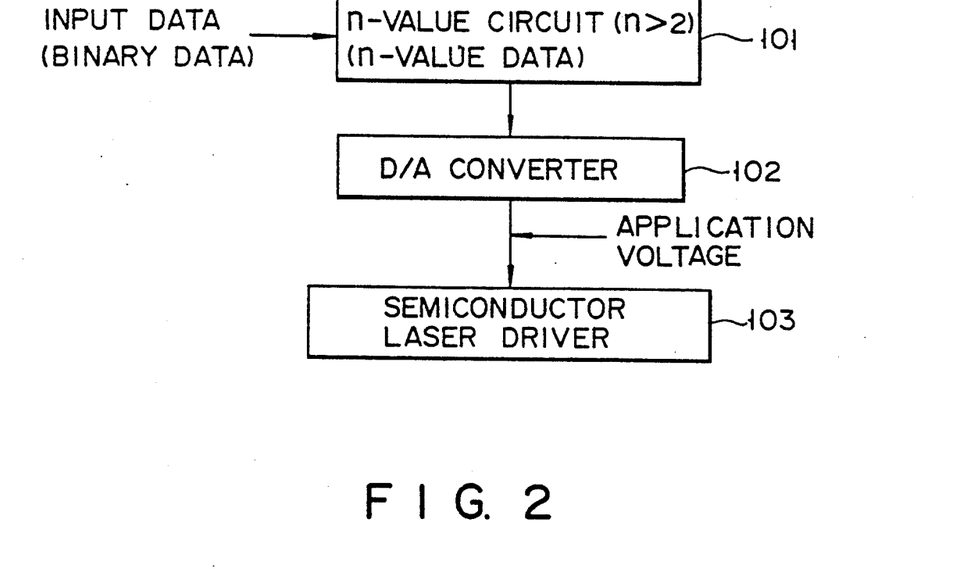
FIG. 2 is a block diagram of the record signal processor in the apparatus shown in FIG. 1.

The record signal processor 10 will now be described in detail below. FIG. 2 is a block diagram of a schematic arrangement of a presently preferred embodiment of the record signal processor. As shown in FIG. 2, processor 10 comprises an n-value circuit 101, a D/A converter 102, and a semiconductor laser driver 103. Input data (the data signal) is input in a binary state, i.e., as a binary signal. This signal is converted into n-bit data, i.e., n-value data, by n-value circuit 101 in accordance with the degree of multiplexing of record data. The n-value data is then converted into an analog signal by D/A converter 102 and is applied to semiconductor laser driver 103 as a voltage. As a result, the intensity or other characteristic of the laser beam is modulated at n levels.

Note that applied voltages corresponding to multilevel data to be applied to a semiconductor laser driver may be prepared in advance without using a D/A converter, wherein gates of the applied voltages may be switched in accordance with the bit values of the data so as to modulate recording power or the like.

Figure 3:
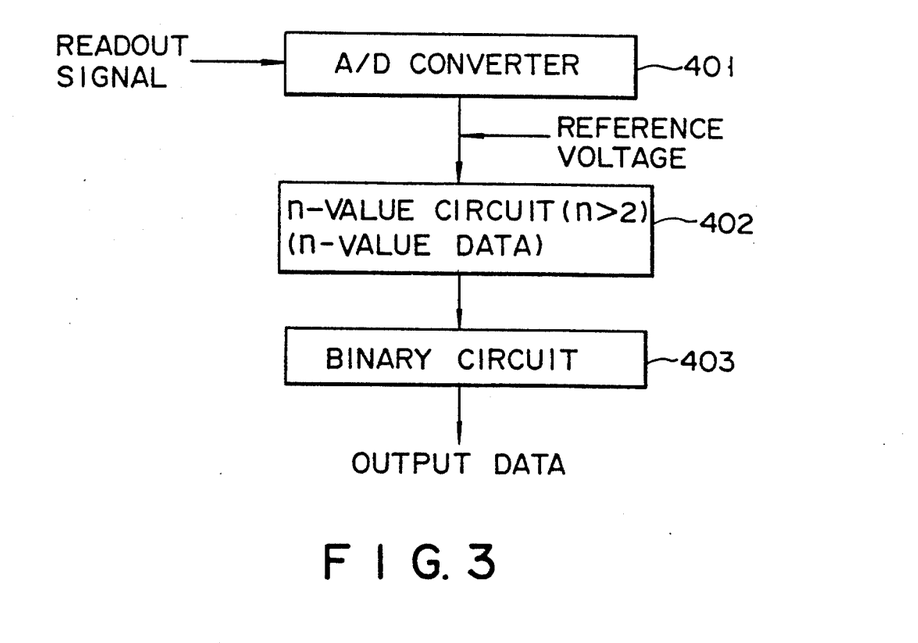
FIG. 3 is a block diagram of the reproduction signal processor in the apparatus shown in FIG. 1.

Reproduction signal processor 40 will now be described in detail below. FIG. 3 is a block diagram of a schematic arrangement of the reproduction signal processor according to a presently preferred embodiment. As shown in FIG. 3, processor 40 comprises an A/D converter 401, an n-value circuit 402, and a binary circuit 403. A readout signal output from processing circuit 14 (FIG. 1) is digitized by A/D converter 401. The digitized signal is then converted into an n-value signal by n-value circuit 402 by comparing it with a predetermined reference voltage (or reference current). Subsequently, the n-value signal is converted into a binary signal by binary circuit 403 and is output therefrom. As a result, the recorded multi-value data is demodulated.

Figure 4:
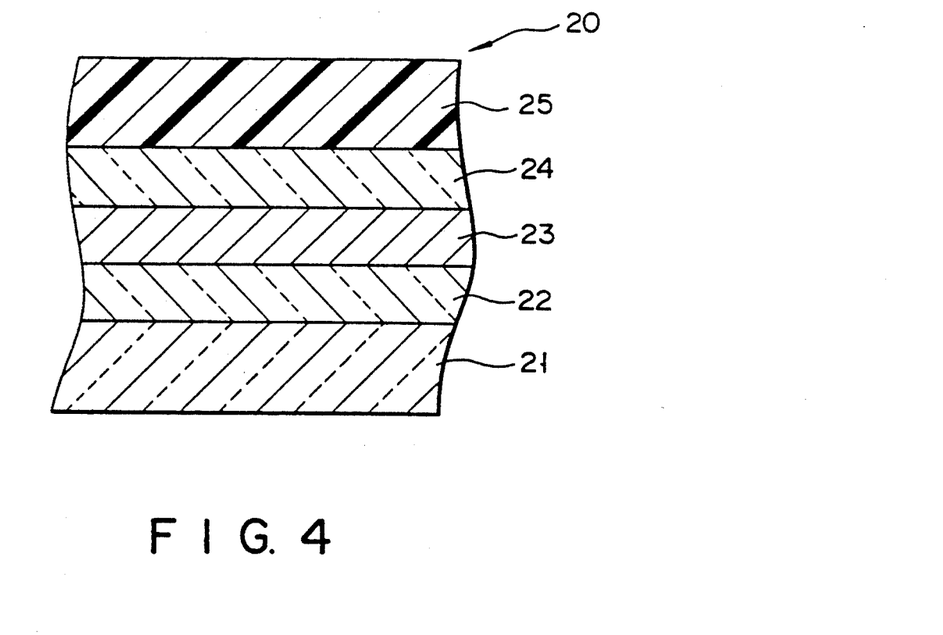
FIG. 4 is a sectional view of an information recording medium in which information is recorded by the apparatus shown in FIG. 1.

Information recording medium 20 will now be described in detail below. FIG. 4 is a sectional view of an information recording medium for us with the present invention. A substrate 21 is made of a transparent material whose quality does not change significantly over time, e.g., an acrylic resin such as polymethylmethacrylate, a polycarbonate resin, an epoxy resin, a styrene resin, or a glass material. A protective layer 22, a recording layer 23, a protective layer 24, and a surface protective layer 25 are formed on the substrate 21 in the order named.

Recording layer 23 is formed of a material whose state is changed upon radiation of a laser beam. A phase transformation type material may be used as one example of such a material. In a recording layer of the phase transformation type, phase transformation occurs between, e.g., a crystalline phase and an amorphous phase depending on radiating conditions of a laser beam. In this case, when the radiation energy of a laser beam is modulated between three levels or more, one or more intermediate phases with different crystallinities can be formed in addition to the crystalline and amorphous phases. Since these phases are different from each other in optical characteristics such as reflectivity and transmittance, multi-value data can be recorded and reproduced by utilizing this phase transformation.

Examples of such a phase transformation type material include chalcogenide amorphous semiconductor material, e.g., GeTe, TeSe, GeSbSe, $TeO_x$, InSe, and GeSbTe, and composite semiconductor material, e.g., InSb, GeSb, and InSbTe. Recording layer 23 can be formed by vacuum evaporation, sputtering, or the like. The thickness of recording layer 23 preferably falls within the range from several nm to several $\mu$m in terms of practical applications.

Protective layers 22 and 24 are arranged to sandwich recording layer 23, thus preventing disintegration of the recording layer 23 while permitting formation of holes therein upon radiation of a laser beam. Protective layers 22 and 24 can be made of $SiO_2$, SiO, AlN, $Al_2O_3$, $ZrO_2$, $TiO_2$, $Ta_2O_3$, ZnS, Si, or Ge by vacuum evaporation or sputtering. The thickness of each of protective layers 22 and 24 preferably falls within the range from several nm to several $\mu$m in terms of practical applications.

Protective layer 25 is formed to prevent damage from dust and the like during use of information recording medium 20, and normally is made of an ultraviolet-curing resin or the like. Protective layer 25 can preferably be formed by coating, e.g., an ultraviolet-curing resin on protective layer 24 by a spin coat method, and curing it by radiation of ultraviolet light. The thickness of protective layer 25 preferably falls within the range from several nm to several hundreds $\mu$m in terms of practical applications.

The above description illustrates a one-side information recording medium. However, the present invention can be used with a two-side data recording medium, such as formed by bonding two one-side information recording media to each other with recording layers 23 located inside.

Recording/reproducing/erasing operations of information with respect to the recording layer 23 will now be described below with reference to FIG. 5, which pertains by way of example to a recording layer of the phase transformation type.

Phase transformation type recording layer 23 is normally amorphous as deposited, and this amorphous state is assumed to be an initial state. In order to stabilize the amorphous state, a state involving annealing or aging may alternately be selected to be the initial state. A crystallized state, obtained by radiating a laser beam on the entire recording layer 23, may be used as an initial state.

RECORDING

As described above, data recording can be performed by radiating a laser beam from semiconductor laser 11 onto recording layer 23 through optical system 30 to crystallize a radiated portion of layer 23. In this case, a binary data signal is converted into n-value data (n-bit data (n>2)) by n-value circuit 101 of record signal processor 10. The energy of the laser beam output from laser 11 is modulated at n levels in accordance with the n-value data. As a result, the crystallinity of the laser beam-radiated portion of recording layer 23 can be varied among the n levels in accordance with the modulated energy of the laser beam.

Figure 5:
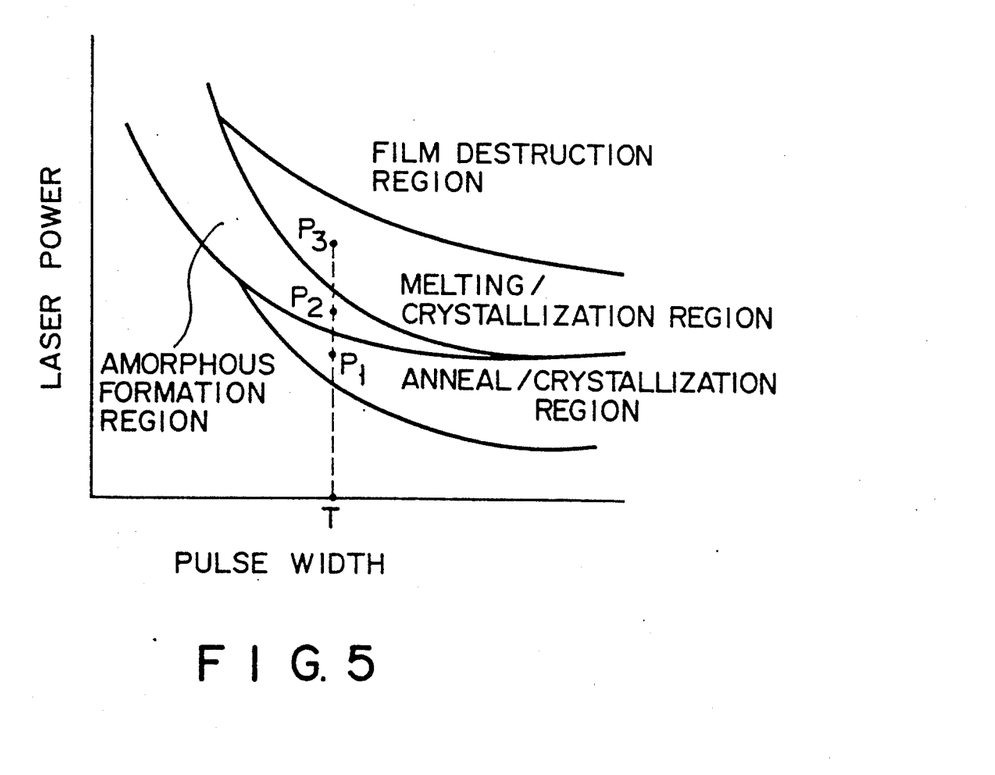
FIG. 5 is a graph of radiating conditions of a laser beam and states of a laser beam-radiated portion of a recording layer.

FIG. 5 shows the state of a beam-radiated portion of recording layer 23 corresponding to the power and pulse width of the recording laser beam. Referring to FIG. 5, when a laser beam having a pulse width T and power $P_1$ is radiated onto medium 20, the radiated portion is crystallized upon annealing. When a laser beam having pulse width T and power $P_2$ is radiated, the beam-radiated portion becomes amorphous after melting. When a laser beam having pulse width T and power $P_3$ is radiated, the beam-radiated portion is crystallized after melting. That is, if the power level of the radiated laser beam exceeds the level at which the recording medium becomes amorphous after melting, since it becomes difficult to naturally cool a radiated spot, the radiated portion cannot be quickly cooled and an amorphous state is difficult to obtain. If the power of the laser beam to be radiated falls within the range at which melting/amorphous formation occurs, the degree of amorphous formation in the radiated portion on the recording medium is increased, i.e., the crystallinity is decreased. Thus, with changes in the power (and hence energy) of the laser beam, variations in the optical characteristics, e.g., reflectivity and transmittance, of the record spot can be achieved.

As described above, various states corresponding to the n levels having different crystallinities can therefore be formed at the laser beam-radiated portion (to be referred to as a record spot hereinafter) by converting data into signals having n levels and then modulating the energy of the laser beam at the n levels in accordance with the signals within an anneal/crystallization region, a melting/amorphous formation region or a melting/crystallization region. Note that one of the n signal levels can be selected to correspond to data even without radiation of a laser beam. In this case, states corresponding to n-1 levels can be formed within a record spot.

If tee intensity and pulse width of the laser beam are respectively set to be P and T, energy E of the laser beam can be given by $E = P \times T$. Therefore, in order to change the energy E, one or both of the intensity and pulse width of the laser beam may be changed. Note that as the energy of a radiated beam is changed, the record spot size is changed.

Since the reflectivity and transmittance of a record spot change in accordance with information recorded in the spot through changes in its state, data can be reproduced by radiating a reproducing laser beam (to be described later) and detecting the reflectivity or transmittance of the record spot.

Figure 6A:
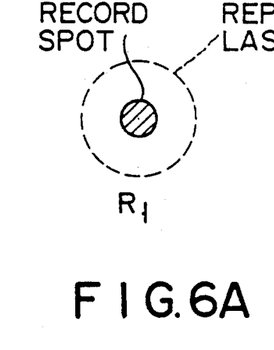
FIGS. 6A to 6C are views for explaining reflectivity changes depending on the size of a record spot.
Figure 6B:
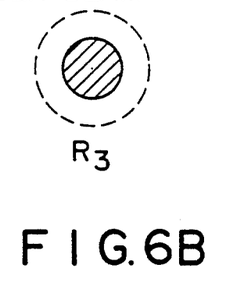
Figure 6C:
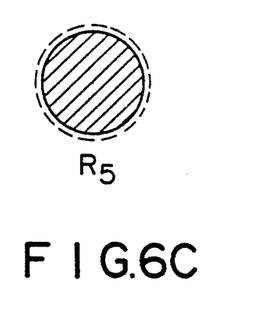

A recording operation will be described in further detail by exemplifying a recording operation using 6-bit data. In this example, the amorphous state of the recording layer is set to be an initial state. Crystallinity of the recording layer is taken into consideration first. Assume that the laser beam energy required for complete crystallization of a radiated portion is given as $E_5$, and energies corresponding to intermediate levels are respectively given a $E_1$ to $E_4$ (in increasing order of energy, respectively). When laser beams having energies $E_1$ to $E_4$ are radiated, part of each radiated portion is crystallized and the remaining portion becomes amorphous; thus, intermediate states can be obtained in which crystalline and amorphous phases are present at the same time. As the energy is increased from $E_1$ to $E_4$, the crystallinity of the radiated portion is increased. In addition, the reflectivity (upon radiation by a reproducing beam) is increased or decreased in accordance with changes in crystallinity of the record spot. The record spot size is also sequentially increased with an increase in laser beam energy from $E_1$ to $E_5$. Since the radiated spot size of a reproducing laser beam is constant, as shown by the dashed lines in FIGS. 6A to 6C, the ratio of the record spot size to the radiated spot size of the reproducing laser beam can be changed, resulting in a change in reflectivity. Furthermore, a large reflectivity change can be caused by the synergistic effect of changes in crystallinity and record spot size. In this case, if the number of bits in the data is selected to correspond to a non-radiated laser beam and radiated laser beams having the above-described energies $E_1$ to $E_5$, 6-bit data can be recorded in a single record spot. If the reflectivity of a non-radiated portion is $R_O$, and reflectivities corresponding to laser beam energies $E_1$ to $E_5$ are $R_1$ to $R_5$, respectively, a relationship as shown in the following Table 1 is established between laser beam energy, reflectivity, and the number of bits.

TABLE 1

| Laser beam energy | Reflectivity | Data bit |
|---|---|---|
| 0 | $R_0$ | 0 |
| $E_1$ | $R_1$ | 1 |
| $E_2$ | $R_2$ | 2 |
| $E_3$ | $R_3$ | 3 |
| $E_4$ | $R_4$ | 4 |
| $E_5$ | $R_5$ | 5 |

Figure 7:
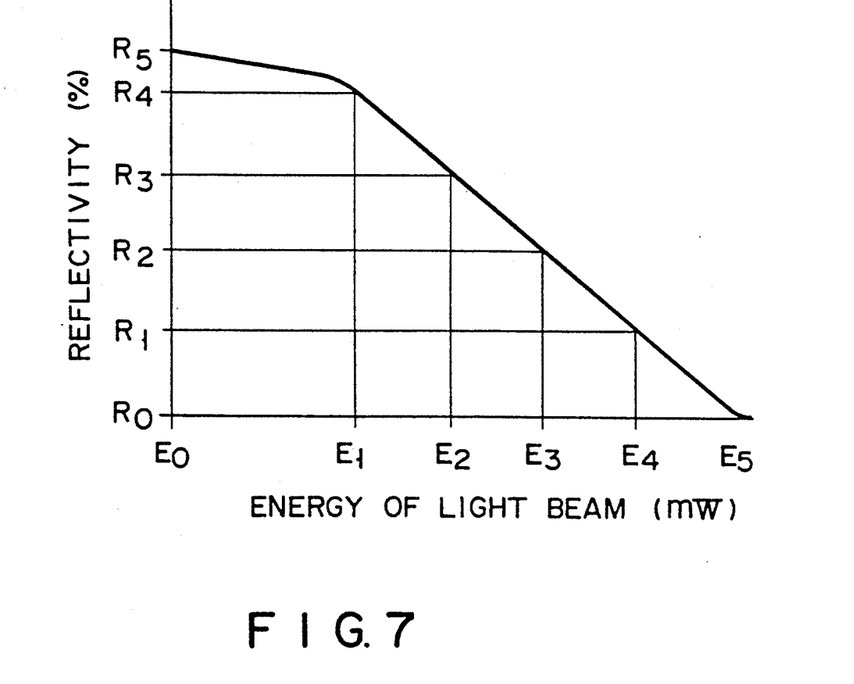
FIG. 7 is a graph of the energy of a laser beam and the reflectivity of a beam-radiated portion.

FIG. 7 shows the relationship between the energy of a laser beam and reflectivity.

Such multi-value recording can also be performed by changing the wavelength of a laser beam output from semiconductor laser 11 in a multi-level manner in accordance with data signals. More specifically, in the present invention, the above-described semiconductor laser, an HeNe laser or the like, can be suitably used as a light source. The laser beam emitted from such a light source has an emission pattern based on the $TEM_{OO}$ fundamental mode, and its sectional intensity distribution exhibits a Gaussian distribution. When such a beam is converged by a lens, it can be converged only to a limited radius due to diffraction. If the minimum beam radius is D (beam waist), the following equation can be established:

$$D = K \cdot \lambda / Na$$

where K is a constant ($K \cong 0.41$), $\lambda$ is the wavelength of a light beam, and NA is the numerical aperture of a lens.

As is apparent from this equation, as the wavelength $\lambda$ of a laser beam is decreased, the converged spot diameter is decreased. That is, when only the wavelength is changed with its intensity and pulse width kept constant, the diameter of a beam-radiated portion is changed, and the density of energy to be applied is changed. Therefore, the reflectivity of a radiated portion can be changed in multiple levels by modulating a wavelength in a multi-level manner, and multi-value recording can be performed in the same manner as described above. In addition, since the spot size itself is changed, the reflectivity is changed upon the change of spot size.

REPRODUCTION

Data recorded by multi-value recording is converted into an electrical signal by opto-electric conversion element 12 in accordance with the reflectivity of a laser beam-radiated portion, i.e., a record spot. This signal is processed by reproduction signal processor 40 so as to be reproduced. Note that data can be reproduced by detecting transmittance instead of reflectivity.

As shown in Table 1, a 1:1 correspondence may be established between values of reflectivity and data bits in reproduction by detecting the reflectivity of a laser-radiated portion subjected to multi-value recording. In addition, an approximate value of each reflectivity may be set to correspond to each data bit, as shown in Table 2, or stepwise correspondence may be established, as shown in Table 3.

TABLE 2

| Reflectivity | Data bit |
|---|---|
| $R_0 \pm a_0$ | 0 |
| $R_1 \pm a_1$ | 1 |
| $R_2 \pm a_2$ | 2 |
| $R_3 \pm a_3$ | 3 |
| $R_4 \pm a_4$ | 4 |
| $R_5 \pm a_5$ | 5 |

TABLE 3

| Reflectivity | Data bit |
|---|---|
| $-R_0$ | 0 |
| $R_0 - R_1$ | 1 |
| $R_1 - R_2$ | 2 |
| $R_2 - R_3$ | 3 |
| $R_3 - R_4$ | 4 |
| $R_4 - R_5$ | 5 |

ERASURE

If the recording layer 23 is of a phase transformation type, phase transformation of the layer can be reversibly caused in accordance with the radiating conditions of a laser beam. In this embodiment, since part of all of a multi value-recorded portion is crystallized, a laser beam is radiated on this portion and the radiated portion is melted and quickly cooled to cause phase transformation from a crystalline state to an amorphous state, thereby erasing data.

EXAMPLES

Examples of the present invention will be described below.

EXAMPLE 1

A data signal was converted by six-value circuit into a signal having six levels 0 to 5. An information recording medium was then irradiated with a laser beam whose power was modulated by a semiconductor laser driver at six levels of 0 mW, 6 mW, 8 mW, 10 mW, 12 mW, and 14 mW in accordance with the six levels of the signal.

An optical disk was used as the information recording medium. The optical disk was obtained by sequentially forming a 1,000-Å thick $SiO_2$ protective layer, a 1,000-Å thick $(In_{48}SB_{52})_{98}Te_2$ recording layer, a 1,000-Å thick $SiO_2$ protective layer, and an ultraviolet-curing resin layer on a polycarbonate substrate. The recording layer exhibited an amorphous state as its initial state, and its phase transformation was caused upon radiation by a laser beam. Upon radiation of a laser beam having a power from 6 to 12 mW, crystallization of the radiated portion progressed halfway, i.e., to an intermediate stage. Substantially complete crystallization occurred upon radiation by a laser beam having a power of 14 mW. In addition, Table 4 shows the reflectivity of the each record spot corresponding to each data bit.

TABLE 4

| Data bit | Laser power (mW) | Reflectivity (%) |
|---|---|---|
| 0 | 0 | 37 |
| 1 | 6 | 35 |
| 2 | 8 | 32 |
| 3 | 10 | 30 |
| 4 | 12 | 28 |
| 5 | 14 | 25 |

As shown in Table 4, the reflectivity of a non-radiated portion was 37%, and the reflectivity of a radiated portion was sequentially decreased from 35 to 25% as laser power was increased from 6 to 14 mW in 2 mW increments.

Data recorded in this manner was reproduced as follows. A 0.5 mW continuous beam emitted from a semiconductor laser was radiated on the recording layer of a recording medium. A beam reflected by the recording layer was output from a processing circuit as an analog signal having six levels 0 to 5. The analog signal was digitized by an A/D converter and was then subjected to a six-value processing by a six-value circuit. Finally, the resultant value was converted into a binary value by a binary circuit, and was output therefrom as reproduced data. In this case, as shown in Table 5, each detected reflectivity and its approximate value correspond to a different data bit.

TABLE 5

| Reflectivity | Data bit |
|---|---|
| $37 \pm a_1$ | 0 |
| $35 \pm a_2$ | 1 |
| $32 \pm a_3$ | 2 |
| $30 \pm a_4$ | 3 |
| $28 \pm a_5$ | 4 |
| $25 \pm a_6$ | 5 |

In this manner, six-level data was read from record spot portions of the recording medium.

EXAMPLE 2

A case wherein data having four levels is recorded will be described in this example.

Figure 8:
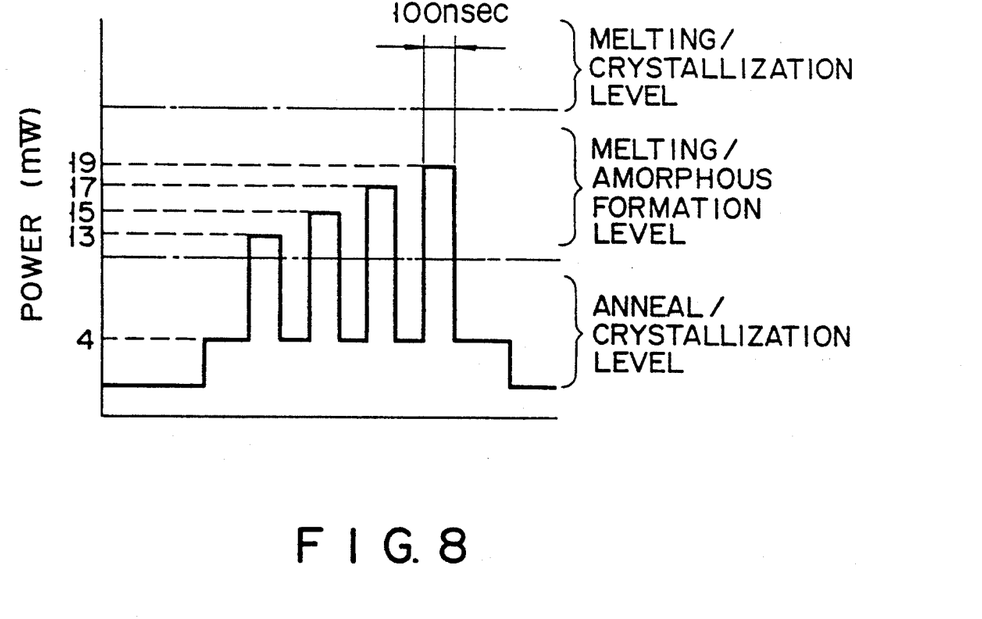
FIG. 8 is a graph of the power and pulse of a laser beam when overwrite is performed.

A record signal was converted by a four-value circuit into signals having four levels 0 to 3. The power of a laser beam was modulated by a semiconductor laser driver at four levels in accordance with the four signal levels, and was then radiated onto a recording medium. The laser beam used in this case was obtained by superimposing a pulse beam $E_2$ having four power levels on a continuous beam having a power of 4 mW. The pulse beam had a width of 100 nsec, and powers of 13 mW, 15 mW, 17 mW, and 19 nW in accordance with the four signal levels 0 to 3. FIG. 8 shows the pulse and power of such a laser beam. Note that the four power levels of the pulse beam $E_2$, as shown in FIG. 8, correspond to the melting/amorphous formation region shown in FIG. 5.

An optical disk was used as the data recording medium. The optical disk was obtained by sequentially forming a 1,000-Å thick $SiO_2$ protective layer, a 1,000-Å thick $(In_{48}Sb_{52})_{98}Te_2$ recording layer, a 1,000-Å thick $SiO_2$ protective layer, and an ultraviolet-curing resin layer on a polymethylmethacrylate substrate. The recording layer was amorphous as deposited. The entire surface of the recording layer was irradiated with a continuous laser beam so as to be crystallized. This state was set to be an initial state.

The optical disk obtained in such a manner was irradiated with a laser beam obtained by superimposing the continuous beam $E_1$ with the pulse beam $E_2$ whose power was modulated at four levels in accordance with the data signal. With this operation, new data can be recorded by the pulse beam $E_2$ while previous data is erased due to radiating by the continuous beam $E_1$ having the anneal/crystallization level. That is, multi-value overwriting can be performed by power modulation of a laser beam.

Figure 9:
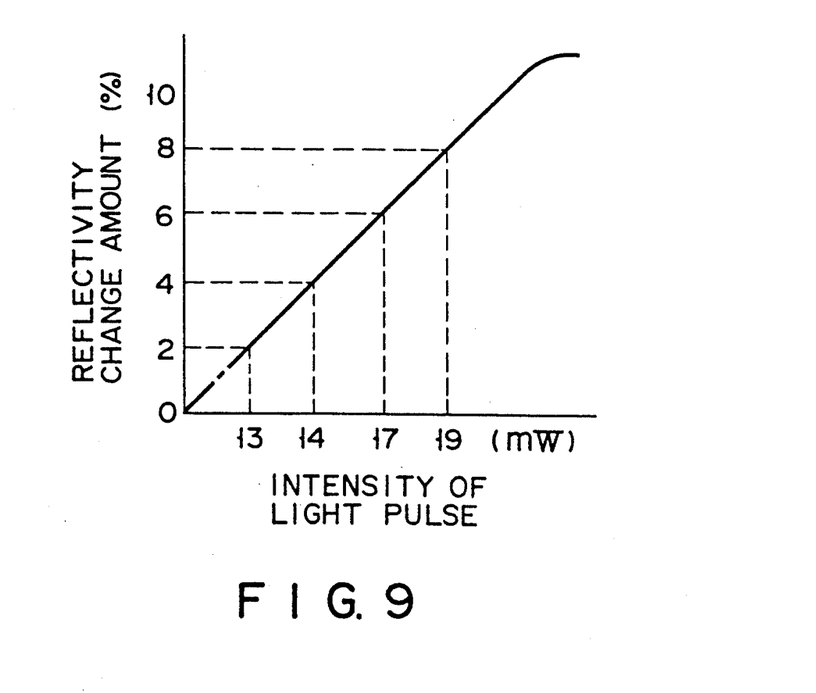
FIG. 9 is a graph of laser beam power and the reflectivity change amount of a beam-radiated portion in an example of the present invention.

Four states $T_1$, $T_2$, $T_3$, and $T_4$, corresponding to the four power levels in an increasing order of power, were formed in record spot portions of the recording layer irradiated with the pulse beam $E_2$. The crystallinity of the respective record spots was sequentially decreased from $T_1$ to $T_4$. At $T_4$, a substantially amorphous state was obtained. The reflectivity of the spots increased with decreases in crystallinity. As a result, the reflectivity change amount (with reflectivity in the initial state being selected as a reference value) was increased from 2 to 8% in 2% increments, as shown in FIG. 9.

Table 6 shows a relationship between data bits, the power of a laser beam to be radiated, record states of a recorded portion, and a reflectivity change amount.

TABLE 6

| Data bit | Laser power (mW) | Record state | Reflectivity change amount (%) |
|---|---|---|---|
| 0 | 13 | $T_1$ | 2 |
| 1 | 15 | $T_2$ | 4 |
| 2 | 17 | $T_3$ | 6 |
| 3 | 19 | $T_4$ | 8 |

The data recorded in this manner was reproduced as follows. A 0.5-mW continuous beam emitted from the semiconductor laser was radiated on the recording medium. A beam reflected by the recording layer was output from a processing circuit as an analog signal having four levels 0 to 3, in accordance with the reflectivity of each state. The analog signal was digitized by an A/D converter and was then converted into a four-value signal. Finally, the signal was converted into a binary value by a binary circuit and was output therefrom as reproduced data. As in Example 1, in this example the value of detected reflectivity from each record spot, and its approximate range are selected to correspond to a different data bit. Table 7 shows this correspondence.

TABLE 7

| Reflectivity change amount (%) | Data bit |
|---|---|
| $2 \pm \alpha_1$ | 0 |
| $4 \pm \alpha_2$ | 1 |
| $6 \pm \alpha_3$ | 2 |
| $8 \pm \alpha_4$ | 3 |

$(2 >> \alpha_1, \alpha_2, \alpha_3, \alpha_4)$

In this manner, four-level data was read from the record spots of the recording medium. Note that in this example power modulation was performed in the melting/amorphous formation region. However, power modulation can also be performed according to the present invention within the anneal/crystallization or melting/crystallization region.

As has been described above, according to the present invention, multi-level data can be recorded in a single record spot on the basis of a conventional data recording apparatus and high-density recording can therefore be effectively achieved in practical applications. Moreover, high-speed data processing can be realized as a result.

In addition, as described in Example 2, a so-called overwrite operation can be performed, involving recording new data while erasing previous data. The present invention is thus highly advantageous in practical applications.

In the above-described examples, six- and four-level data are recorded in the respective record spots. However, the present invention is not limited to this arrangement. By modulating the laser power between an arbitrary number of levels, data having an arbitrary number of bits can be recorded in accordance with levels of power modulation.

In addition, a phase transformation type recording layer is used in the above-described examples. However, the present invention is also not limited to arrangement. Any recording medium can be used as long as its state is changed in multi-level manner in accordance with the energy of a radiated light beam. For example, a recording layer wherein pits are formed upon radiation of a light beam can be used as such a recording medium. In this case, the size of each pit is changed by changing the energy of a light beam, thus performing multi-value recording.

The scope of the present invention is therefore best reflected by the following claims understood in light of the present specification and illustrative drawings.

What is claimed is:

1. An information recording apparatus for recording information in an information recording medium comprising:
   signal processing means for converting an information signal to be recorded into a processed signal having not less than three levels;
   light beam output means, including a light source, for emitting a light beam having a beam size varying in accordance with energy of said light beam, said energy being modulated at multiple levels in accordance with the levels of the processed signal; and optical means for directing the light beam onto said information recording medium to provide a beam-radiated portion, wherein multi-level information is recorded in said information recording medium by varying the beam-radiated portion of said information recording medium among a plurality of states according to the energy of the light beam.

2. An information recording method comprising the steps of:

converting information to be recorded into a signal having not less than three levels;

providing a light beam whose energy is modulated at multiple levels in accordance with the signal by varying a beam size of the light beam in accordance with the energy of said light beam; and radiating the light beam onto an information recording medium to change a radiated portion of the medium between a plurality of states, thereby recording multi-level information in said medium.

* * * * *